C. BUCKLEY & L. L. SAWYER.
Curtain Roller and Bracket.

No. 203,414. Patented May 7, 1878.

Witnesses:

Chauncey Buckley &
Lodowick L. Sawyer,
Inventors.
By Atty.

UNITED STATES PATENT OFFICE.

CHAUNCEY BUCKLEY, AND LODOWICK L. SAWYER, OF MERIDEN, CONN.

IMPROVEMENT IN CURTAIN-ROLLERS AND BRACKETS.

Specification forming part of Letters Patent No. 203,414, dated May 7, 1878; application filed November 30, 1877.

*To all whom it may concern:*

Be it known that we, CHAUNCEY BUCKLEY and LODOWICK L. SAWYER, of Meriden, in the county of New Haven and State of Connecticut, have invented a new Improvement in Curtain-Fixtures; and we do hereby declare the following, when taken in connection with the accompanying drawings and the letters of reference marked thereon, to be a full, clear, and exact description of the same, and which said drawings constitute part of this specification, and represent, in—

Figure 1:
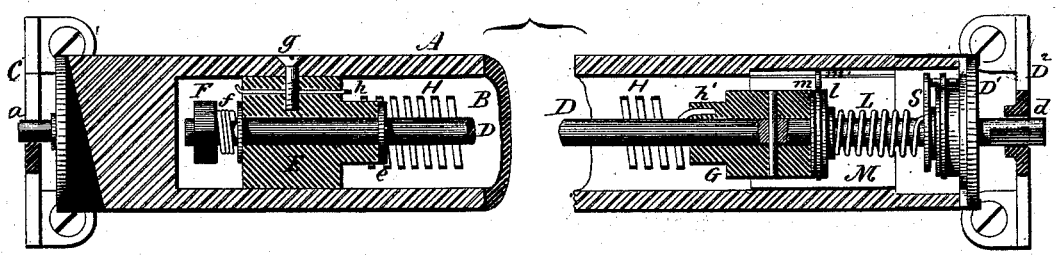

Figure 1, a longitudinal section of the center-roll, and in Figs. 2, 3, 4, 5 detached views enlarged.

This invention relates to an improvement in that class of curtain-fixture in which a spiral spring is arranged within the roll, and employed as a means for automatically rolling up the curtain.

The object of this invention is principally to apply a certain amount of friction between the spring and the roll to offer a resistance to drawing down the curtain, but released, going in the opposite direction or winding up the curtain; and also a device to automatically engage the spring when the roll is removed from the bracket, and prevent its unwinding.

The roll A may be of any suitable material, preferably wood, bored out to form a concentric chamber, B, therein, and is provided at one end with a gudgeon, $a$, to rest in the bracket C in the usual manner. Within the chamber B a concentric shaft, D, is arranged, which protrudes through the head $D^1$, and the protruding portion $d$ made angular in form, to fit a correspondingly-shaped seat in the bracket $D^2$. This angular shape of the end $d$ and corresponding shape in the bracket prevents the shaft from turning with the roll A— that is to say, the shaft D is stationary, while the roll A will revolve, the shaft D forming a bearing for such revolution of the roller.

At the inner end of the shaft D a bearing, E, is formed, through which the shaft D extends. A collar, $e$, on the shaft, at one end of the bearing E, and a spring, $f$, and nut F at the opposite end of the bearing, enable a certain amount of friction to be produced between the roll and the shaft. The bearing E is arranged upon the shaft, and the adjustment made before the shaft is inserted into the roll, and, when so inserted, the bearing E is made fast to the roll by a screw, $g$, or otherwise. The friction here produced will oppose the turning of the roll in either direction, though but slightly.

Near the outer end of the shaft D a block, G, is made fast thereto, and around the shaft, between the said block G and the bearing E a spiral spring, H, is arranged, one end, $h$, made fast to the stationary bearing E, the other, $h'$, made fast to the block G; hence, the shaft being stationary, and the roll revolved in one direction, the spring will be wound, and the reaction of the spring will turn the roll in the opposite direction. The action of the spring in this case is substantially that in the usual construction in this class of fixtures.

Figure 4:
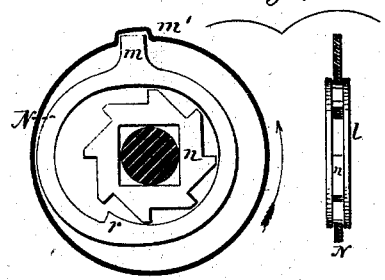
Figure 5:
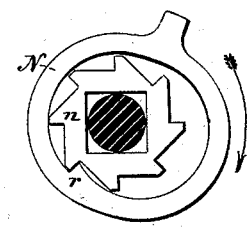

As the weight of the curtain tends to unroll it, and having an increasing tendency, according as the extent of unrolling is increased, it is necessary to introduce an opposing power to such self-unwinding. To this end a loose collar, $l$, is arranged on the shaft, against the block G, or at any convenient point, this collar having a ratchet, $n$, arranged upon it, or in connection with it, and bearing against the collar is a spiral or other suitable spring, L, the tendency of which is to press the collar against the block G, or any other opposing surface which may be applied from some other point, the collar free to turn upon the shaft except as opposed by such friction. On this collar, around the ratchet, is a stirrup, N, (see Fig. 4,) which is loose thereon, but has a projection, $m$, which extends into a corresponding slot, $m'$, in the roll. On the inside of this stirrup is a projection, or what may be called a pawl, $r$. The opening in the stirrup is elongated transversely, as seen in Fig. 4, so that when the roll revolves as indicated by the arrow, which is in the direction of raising or rolling up the curtain, the roll with the stirrup will turn freely around, and without engaging the ratchet $n$, leaving the ratchet, therefore, stationary with the shaft; but when the roll is turned in the opposite direction, as indicated in Fig. 5, then the stirrup will be immediately turned, so as to bring the pawl $r$ into engagement with one of the teeth of the ratchet; and the continued revolution of the roll will cause the turning of the ratchet $n$; but to do this, sufficient power must be applied to overcome the friction on said ratchet.

The weight of the curtain, or its strain upon the roll at its extreme, having been determined, the friction upon the ratchet $n$ is made slightly greater than such strain, and hence will support the curtain at any point. So soon as the surplus friction is overcome, as by lifting the curtain, then the friction is removed, the reaction of the spring takes place, and the curtain is wound upon the roll.

This arrangement of the stirrup with stationary internal pawl and ratchet, and so as to engage in one direction and release in the other, is applicable to other devices than curtain-fixtures, and in this application is not to be understood to be limited to curtain fixtures.

For convenience of arranging the frictional device an internal metallic sleeve, M, is placed within the roll, having a notch, $m'$, for the projection $m$ on the stirrup.

Figure 2:
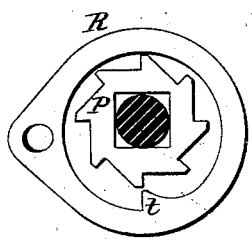

When the spring is wound so as to produce the power required to roll the curtain, and held by the connection of the end $d$ of the shaft with its bracket, the spring is constantly engaged; but if the roll be removed, so as to take the end $d$ of the shaft from its bracket, the end being free would instantly unwind. To prevent this, as well as to conveniently enable the winding of the spring before placing it in its bracket, a ratchet, P, is made fast to the head D' of the roll. Around this ratchet is a stirrup, R, on the same principle as the stirrup N, before described, so that said ratchet shall turn freely within said stirrup in one direction, and engage it by a stationary pawl, $t$, in the opposite direction. This stirrup is, in connection with an arm, S, stationary on the shaft D; and when the shaft is in its bracket, and prevented thereby from turning, the stirrup R is held in relative position to the ratchet as seen in Fig. 2, leaving the roll free to turn in either direction independent of the shaft; but the reaction of the spring, as between the roll and shaft, tends to turn the stirrup in the direction indicated by the arrow in Fig. 3; hence, so soon as the shaft is free from the bracket which holds it, (it being understood that the roll is held firmly in the hand,) the reaction of the spring would cause an instantaneous revolution of the shaft in the direction indicated by the arrow in Fig. 4. Such action immediately brings the pawl $t$ into connection with one of the teeth of the ratchet which is fixed to the roll, and thus makes a positive engagement between the roll and shaft, to prevent turning of the shaft independent of the roll until again replaced in the bracket.

Figure 3:
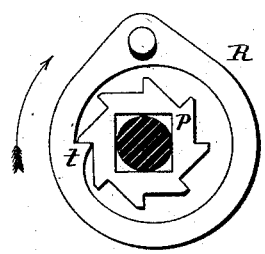

In this condition of the parts, as in Fig. 3, the pawl serves to catch and hold the spring as it is wound preparatory to its being placed in the brackets.

These applicants are aware that it is not new to automatically engage the winding spring with the roll on the removal of the roll from the bracket, or disengage when the roll is placed in the bracket; and therefore do not broadly claim such construction.

We claim—

1. In a curtain-fixture, the combination of the winding roll A, stationary shaft D, and winding spring H with a bearing, E, stationary in the roll at the inner end of the shaft, and through which the shaft passes, but so that the said bearing will turn freely on said shaft, a spring, $f$, on the inner end of said shaft resting against the inner end of the said bearing, and a collar, $e$, stationary on the said shaft, and against the other end of the bearing, all substantially as described.

2. In a curtain-fixture, the combination of the winding roll, stationary shaft, winding spring, and a frictional device between said shaft and roll consisting of a ratchet, loose on said shaft, but in frictional engagement therewith, and a pawl, in connection with the roll, and so as to revolve freely around the ratchet in one direction, and engage the said ratchet in the opposite direction, substantially as and for the purpose described.

3. The combination of a circular toothed ratchet, a stirrup around said ratchet, arranged to revolve concentrically around, but suspended loosely at a single point eccentric to the said ratchet, and with a pawl upon the inner side of said stirrup to engage said ratchet in one direction, but so as to allow said stirrup to revolve in the opposite direction without engagement with said ratchet, substantially as described.

4. In a curtain-fixture, the combination of the winding roll, stationary shaft, spring between said shaft and roll, a ratchet stationary upon said roll, an oscillating stirrup outside and around said ratchet, but in connection with said shaft at a point eccentric to said ratchet, and with a pawl inside said stirrup, substantially as and for the purpose described.

CHAUNCEY BUCKLEY.
LODOWICK L. SAWYER.

Witnesses:
RALPH A. PALMER,
HENRY C. PATTERSON.